(12) United States Patent
Sharma et al.

(10) Patent No.: US 11,690,069 B2
(45) Date of Patent: Jun. 27, 2023

(54) SPLIT-SPECTRUM GRANT REQUEST

(71) Applicant: ARRIS Enterprises LLC, Suwanee, GA (US)

(72) Inventors: Ravi Sharma, Santa Clara, CA (US); Awaiz Khan, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 240 days.

(21) Appl. No.: 16/800,126

(22) Filed: Feb. 25, 2020

(65) Prior Publication Data

US 2021/0266949 A1    Aug. 26, 2021

(51) Int. Cl.
| | | |
|---|---|---|
| *H04W 72/14* | (2009.01) | |
| *H04W 72/04* | (2023.01) | |
| *H04W 16/14* | (2009.01) | |
| *H04W 72/23* | (2023.01) | |
| *H04W 72/0453* | (2023.01) | |

(52) U.S. Cl.
CPC ........... *H04W 72/23* (2023.01); *H04W 16/14* (2013.01); *H04W 72/0453* (2013.01)

(58) Field of Classification Search
CPC . H04W 72/14; H04W 72/0453; H04W 16/14; H04W 72/23
See application file for complete search history.

(56) References Cited

U.S. PATENT DOCUMENTS

| | | | |
|---|---|---|---|
| 2015/0214973 A1* | 7/2015 | Man | H03M 1/1245 455/562.1 |
| 2018/0132241 A1* | 5/2018 | Gayde | H04B 17/318 |
| 2019/0058999 A1* | 2/2019 | Gunasekara | H04W 36/0022 |
| 2020/0092731 A1* | 3/2020 | Beck | H04W 24/08 |
| 2020/0187133 A1* | 6/2020 | Syed | H04W 52/365 |
| 2020/0314659 A1* | 10/2020 | Hannan | H04W 72/082 |
| 2020/0343984 A1* | 10/2020 | Zhao | H04B 17/345 |
| 2021/0022009 A1* | 1/2021 | De Sousa Chaves | H04W 60/02 |
| 2021/0099886 A1* | 4/2021 | Taneja | H04W 72/0453 |
| 2021/0385662 A1* | 12/2021 | Furuichi | H04W 16/14 |

* cited by examiner

*Primary Examiner* — Jasper Kwoh
(74) *Attorney, Agent, or Firm* — Steven Stupp; Stewart Wiener

(57) ABSTRACT

During operation, a radio node may determine a desired bandwidth in a shared-license-access band of frequencies. Then, the radio node may identify two or more sub-spectra based at least in part on the desired bandwidth, where a sum of ranges of frequencies in the sub-spectra equals the desired bandwidth, and a given sub-spectra includes a range of frequencies. Next, the radio node may provide, to the computer, grant requests for the sub-spectra, where a given grant request includes a request to reserve a given one of the sub-spectra for use by the radio node, and a probability of approval of the given grant request is larger than a probability of a grant request for the desired bandwidth. Note that at least two of the sub-spectra may be separated by an intervening band of frequencies (i.e., at least two of the sub-spectra may be non-contiguous).

20 Claims, 5 Drawing Sheets

SPLIT-SPECTRUM GRANT REQUEST

BACKGROUND

Field

The described embodiments relate to techniques for communicating information among electronic devices. Notably, the described embodiments relate to techniques for providing multiple grant requests for separate portions of a band of frequencies to a spectrum allocation server (SAS) instead of a single grant request for the sum of the portions of the band of frequencies.

Related Art

While many electronic devices communicate with each other via large networks owned by a network operator, small-scale networks associated with entities (such as a company or an organization) are increasingly common. In principle, the small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being used by large networks and small-scale networks. For example, the shared-license-access band of frequencies near 3.5 GHz (notably, the 150 MHz of bandwidth between 3.55 GHz and 3.7 GHz) is being used for general-purpose communication. This shared-license-access band of frequencies is referred to as 'Citizens Broadband Radio Service' or CBRS.

In CBRS, a radio node (which is sometimes referred to as a 'Citizens Band Service Device' or CBSD) may provide a grant request to a SAS (a cloud-based service that manages wireless communication in the CBRS) to reserve a portion of the shared-license-access band of frequencies for its use in a certain geographic location. For example, a radio node may request a grant to reserve 5 MHz of spectrum from the SAS in Boise, Id. If the requested portion of the shared-license-access band of frequencies is available in that location, the SAS may provide a grant response to the radio node with approval of a grant for the requested portion of the shared-license-access band of frequencies. Then, the radio node may provide a heartbeat request to the SAS to request authorization to transmit in the granted portion of the shared-license-access band of frequencies. When the radio node receives a subsequent heartbeat response from the SAS, the radio node is authorized to transmit in the granted portion of the shared-license-access band of frequencies.

However, because CBRS is a shared-license-access band of frequencies, there may be competition for the spectrum or bandwidth. Notably, when a radio node submits a grant request for a portion of the shared-license-access band of frequencies, the SAS may reject the grant request if the requested portion of the shared-license-access band of frequencies has already been allocated to and/or is being used by another user. Additionally, the SAS may withdraw a grant request at any time, which may occur, for example, if a higher priority user requests use of a band of frequencies that has already been assigned to a lower priority user. In either case, the radio node may need to repeat the grant-request and authorization process with the SAS for another portion of the shared-license-access band of frequencies, which can be time-consuming and can result in degraded service.

SUMMARY

A radio node that provides multiple grant requests to a computer is described. This radio node includes: a node or connector; and an interface circuit that communicates with the computer. During operation, the interface circuit may determine a desired bandwidth in a shared-license-access band of frequencies. Then, the interface circuit may identify two or more sub-spectra based at least in part on the desired bandwidth, where a sum of ranges of frequencies in the sub-spectra equals the desired bandwidth, and a given sub-spectra includes a range of frequencies. Next, the interface circuit may provide, addressed to the computer, grant requests for the sub-spectra, where a given grant request includes a request to reserve a given one of the sub-spectra for use by the radio node, and a probability of approval of the given grant request is larger than a probability of a grant request for the desired bandwidth.

Note that the computer may include a SAS. Moreover, the spectrum may be included in a CBRS.

Furthermore, at least two of the sub-spectra may be separated by an intervening band of frequencies (i.e., at least two of the sub-spectra may non-contiguous).

Additionally, the communication with the computer may use wired communication.

In some embodiments, the interface circuit may receive grant responses associated with the computer, where the grant responses include approvals of grants for the sub-spectra. Then, the interface circuit may provide, addressed to the computer, heartbeat requests to request authorization to transmit in the granted sub-spectra. Next, the interface circuit may receive heartbeat responses associated with the computer, where the heartbeat responses authorize the radio node to transmit in the granted sub-spectra. Moreover, the interface circuit may aggregate the sub-spectra into a single aggregate channel.

Furthermore, at least two of the sub-spectra may have different sizes.

Additionally, the desired bandwidth may be determined based at least in part on: a communication history of the radio node, a current capacity demand of the radio node, or an estimated capacity demand of the radio node.

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the computer.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
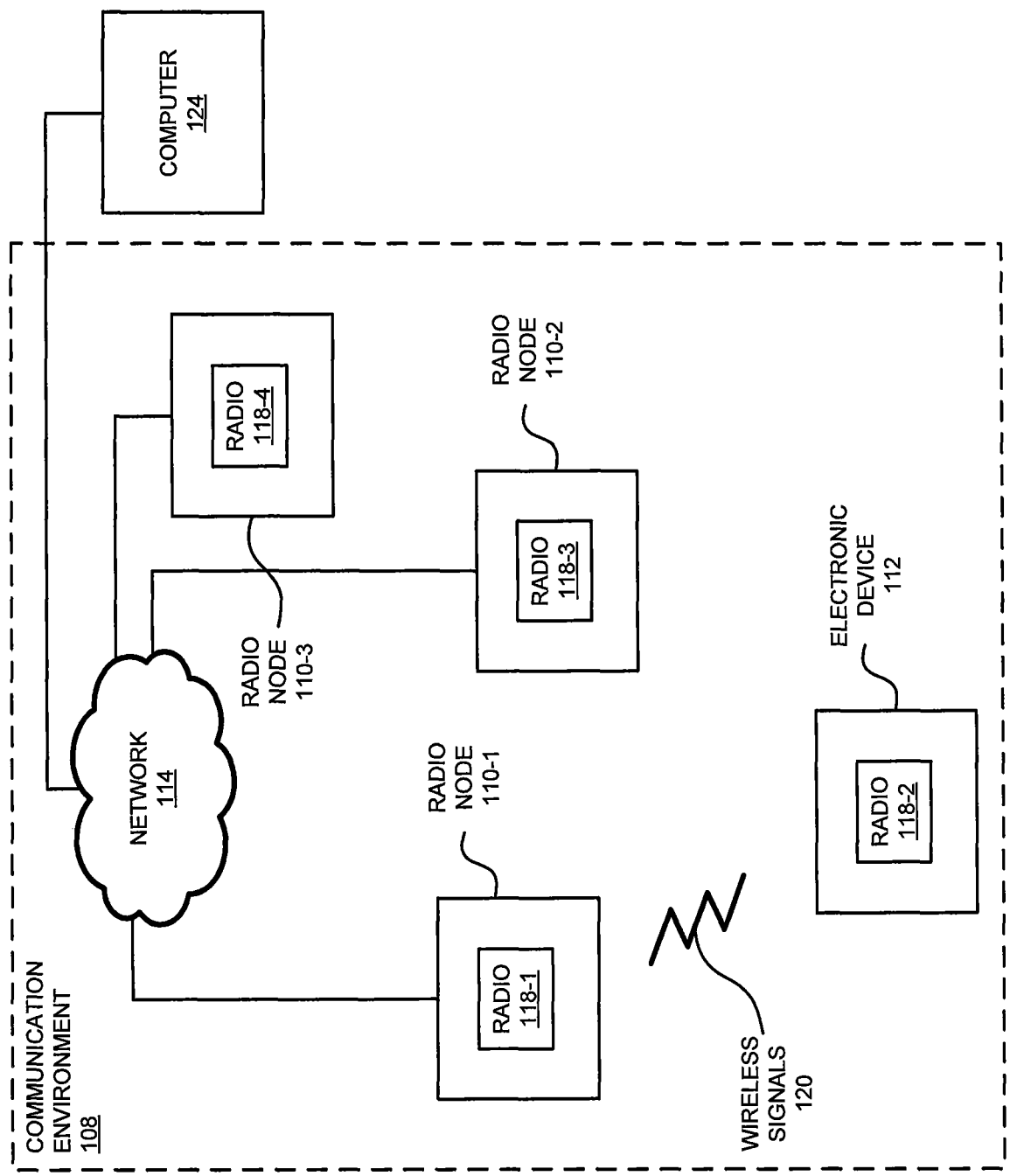
FIG. 1 is a block diagram illustrating an example of communication among a computer, radio nodes and electronic devices in a system in accordance with an embodiment of the present disclosure.

A radio node that provides grant requests to a computer is described. During operation, the radio node may determine a desired bandwidth in a shared-license-access band of frequencies. Then, the radio node may identify two or more sub-spectra based at least in part on the desired bandwidth, where a sum of ranges of frequencies in the sub-spectra equals the desired bandwidth, and a given sub-spectra includes a range of frequencies. Next, the radio node may provide, to the computer, the grant requests for the sub-spectra, where a given grant request includes a request to reserve a given one of the sub-spectra for use by the radio node, and a probability of approval of the given grant request is larger than a probability of a grant request for the desired bandwidth. Note that at least two of the sub-spectra may be separated by an intervening band of frequencies (i.e., at least two of the sub-spectra may be non-contiguous).

By segmenting and providing multiple grant requests for the sub-spectra instead of a single grant request for the entire desired bandwidth, this communication technique may increase the likelihood or probability that at least one of the grant requests for at least one of the sub-spectra is approved. This may reduce or eliminate the need for one or more additional grant requests for a different portion of the shared-license-access band of frequencies. Moreover, when the grant requests for at least two of the sub-spectra are approved, the radio node may combine or aggregate these sub-spectra into a single logical entity or an aggregated channel, which may operate in the same manner as a grant of a single contiguous band of frequencies having the same total bandwidth. Additionally, if the computer withdraws the grant request for one of the sub-spectra in response to a request from a higher priority user, it is highly unlikely that the grant of other of the sub-spectra would also be withdrawn, because the two sub-spectra may not be contiguous frequency ranges. Thus, the radio node may be able to continue to communicate over one of the sub-spectra, reducing or avoiding loss of service. Consequently, the communication technique may reduce or eliminate time delays, and may provide improved communication performance and quality of service in a network that includes the radio node.

We now describe some embodiments of the communication technique. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

However, there are often gaps in the coverage provided by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. As noted previously, because of competition, requests for grants to spectrum or bandwidth in a shared-license-access band of frequencies may be denied. This can result in the need to submit multiple grant requests, which can be time-consuming and can result in degraded service. Additionally, if a grant request is revoked by the SAS in response to, for example, a grant request for the same spectrum by a higher priority user, a radio node may completely lose service until such time that a new grant request is approved by the SAS. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a fixed or portable electronic device). Again, while LTE is used as an example of a cellular protocol, the embodiments herein are not so limited. Moreover, radio nodes 110 may also communicate (via wireless or wired communication, such as Ethernet, in network 114) with each other and with computer 124 (such as a SAS).

Figure 2:
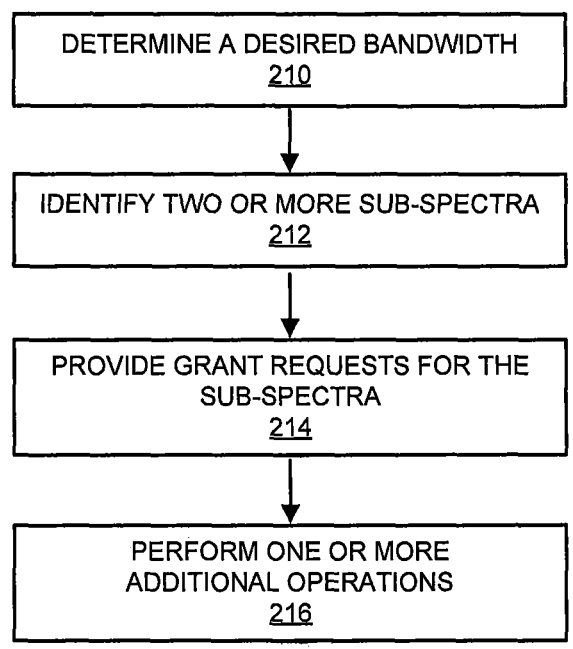
FIG. 2 is a flow diagram illustrating an example of a method for providing grant requests using a radio node in FIG. 1 in accordance with an embodiment of the present disclosure.

As described further below with reference to FIGS. 2-4, one or more of radio nodes 110 may perform a communication technique by communicating with computer 124 via network 114. Using radio node 110-1 as an example, this radio node may provide a grant request to computer 124 to reserve a portion of a spectrum or bandwidth (such as a portion of the spectrum in a shared-license-access band of frequencies or another band of frequencies) for its use. (In the discussion that follows, CBRS is used as an illustrative example of the communication technique.) For example, radio node 110-1 may request a grant to reserve 5, 10, 20, 40, 80, 100 or 150 MHz of spectrum in CBRS from computer 124. In response, computer 124 may provide a grant response to radio node 110-1 with approval of a grant for the requested portion of the shared-license-access band of frequencies.

Then, radio node 110-1 may request from computer 124 authorization to transmit in the granted portion of the shared-license-access band of frequencies. For example, radio node 110-1 may provide a keep-alive message (such as a heartbeat request) to computer 124 in order to request authorization to transmit in the granted portion of the shared-license-access band of frequencies. When radio node 110-1 receives a keep-alive response from computer 124, then radio node 110-1 may be authorized to transmit in the granted portion of the shared-license-access band of frequencies until a transmit expire time has elapsed.

However, when the requested portion of the shared-license-access band of frequencies is larger, it may be more likely that there is another user that currently has an authorized grant to at least a portion of the requested portion of the shared-license-access band. When this occurs, computer 124 may reject the grant request and radio node 110-1 may need to submit one or more additional grant requests for at least a different portion of the shared-license-access band, which will result in time delays, and may degrade communication performance and/or a quality of service in a network that includes radio node 110-1. Additionally, as discussed above, if, after the request is granted, a higher priority user requests a grant of some portion of the granted portion of the shared-license-access band of frequencies, computer 124 may revoke the entire grant and radio node 110-1 may again need to submit a grant request for a different portion of the shared-license-access band.

In order to prevent these problems, in the communication technique, radio node 110-1 may submit multiple grant requests instead of a single grant request to computer 124. Notably, instead of providing a grant request for a desired bandwidth or portion of a shared-license-access band of frequencies, radio node 110-1 may identify two or more sub-spectra or ranges of frequencies in the shared-license-access band of frequencies (which are sometimes referred to as 'cells'), where a sum of ranges of frequencies in the sub-spectra equals the desired bandwidth. Then, radio node 110-1 may provide grant requests for the identified sub-spectra to computer 124, where a given grant request includes a request to reserve a given one of the sub-spectra for use by the radio node. Moreover, by requesting approval of multiple sub-spectra that are each smaller than the desired bandwidth, the communication technique may increase a likelihood or probability that at least one of the grant requests is approved by computer 124.

Note that at least two of the sub-spectra may be separated by an intervening band of frequencies (i.e., at least two of the sub-spectra may non-contiguous). Moreover, at least two of the sub-spectra may have different sizes in some embodiments.

In some embodiments, radio node 110-1 may receive grant responses from computer 124, where the grant responses include approvals of grants for the sub-spectra. Then, radio node 110-1 may provide, to computer 124, heartbeat requests to request authorization to transmit in the granted sub-spectra. Next, radio node 110-1 may receive heartbeat responses from computer 124, where the heartbeat responses authorize radio node 110-1 to transmit in the granted sub-spectra. Once the grants for sub-spectra are approved and authorized, radio node 110-1 may aggregate the sub-spectra into a single aggregate channel. For example, radio node 110-1 may aggregate or combine two or more sub-spectra into a single logical entity or an aggregate channel.

The aforementioned operations in the communication technique may be performed once (such as when radio node 110-1 is turned on), or as needed (such as when grant requests for larger portions of the shared-license-access band are more likely to be rejected by computer 124).

In this way, the communication technique may increase the likelihood or probability of getting approval(s) for the requested sub-spectra, and may also reduce the probability that computer 124 revokes all of the bandwidth that is granted to radio node 110-1. This may reduce or eliminate time delays associated with one or more additional requests for at least a different portion of the shared-license-access band of frequencies, and may ensure improved the communication performance and the quality of service in a network that includes radio node 110-1.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
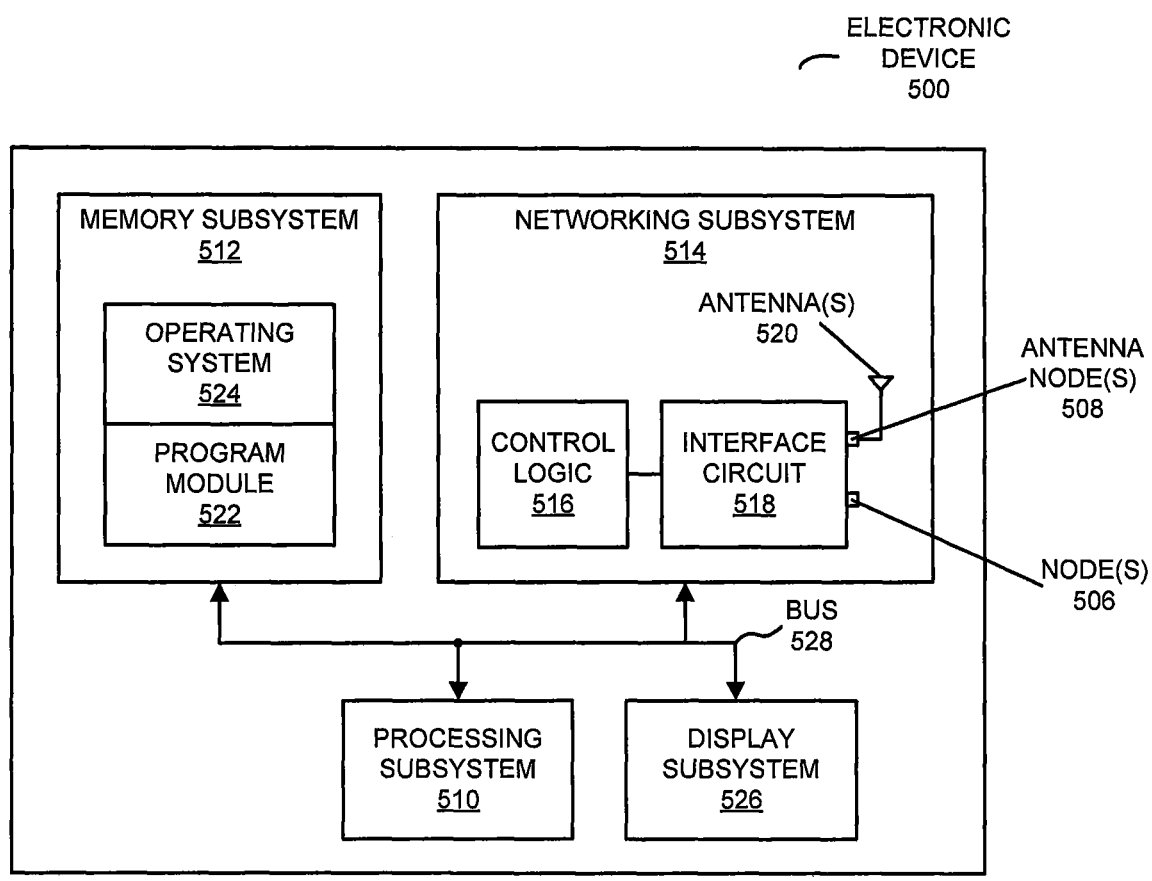
FIG. 5 is a block diagram illustrating an example of an electronic device in accordance with an embodiment of the present disclosure.

As described further below with reference to FIG. 5, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can include transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving frames that include packets.

We now describe embodiments of the method. FIG. 2 presents a flow diagram illustrating an example of a method 200 for providing grant requests, which may be performed by a radio node (such as one of radio nodes 110 in FIG. 1). During operation, an interface circuit in the radio node may determine a desired bandwidth (operation 210) in a shared-license-access band of frequencies. Notably, the desired bandwidth may be determined based at least in part on: a communication history of the radio node, a current capacity demand of the radio node, and/or an estimated capacity demand of the radio node.

Then, the interface circuit may select or identify two or more sub-spectra (operation 212) based at least in part on the desired bandwidth, where a sum of ranges of frequencies in the sub-spectra equals the desired bandwidth, and a given sub-spectra includes a range of frequencies.

Next, the interface circuit may provide, addressed to a computer, grant requests for the sub-spectra (operation 214), where a given grant request includes a request to reserve a given one of the sub-spectra for use by the radio node. Note that a probability of approval of the given grant request is larger than a probability of a grant request for the desired bandwidth.

Note that the computer may include a SAS. Moreover, the spectrum may be included in a CBRS. Furthermore, at least two of the sub-spectra may be separated by an intervening band of frequencies (i.e., at least two of the sub-spectra may non-contiguous). Additionally, at least two of the sub-spectra may have different sizes.

In some embodiments, the interface circuit may optionally perform one or more additional operations (operation 216). For example, the interface circuit may receive grant responses associated with the computer, where the grant responses include approvals of grants for the requested sub-spectra. Then, the interface circuit may provide, addressed to the computer, heartbeat requests to request authorization to transmit in the granted sub-spectra. Next, the interface circuit may receive heartbeat responses associated with the computer, where the heartbeat responses authorize the radio node to transmit in the granted sub-spectra. Moreover, the interface circuit may aggregate the sub-spectra into a single aggregate channel.

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

In some embodiments of method 200, there may be additional or fewer operations. Furthermore, the order of the operations may be changed, and/or two or more operations may be combined into a single operation.

Figure 3:
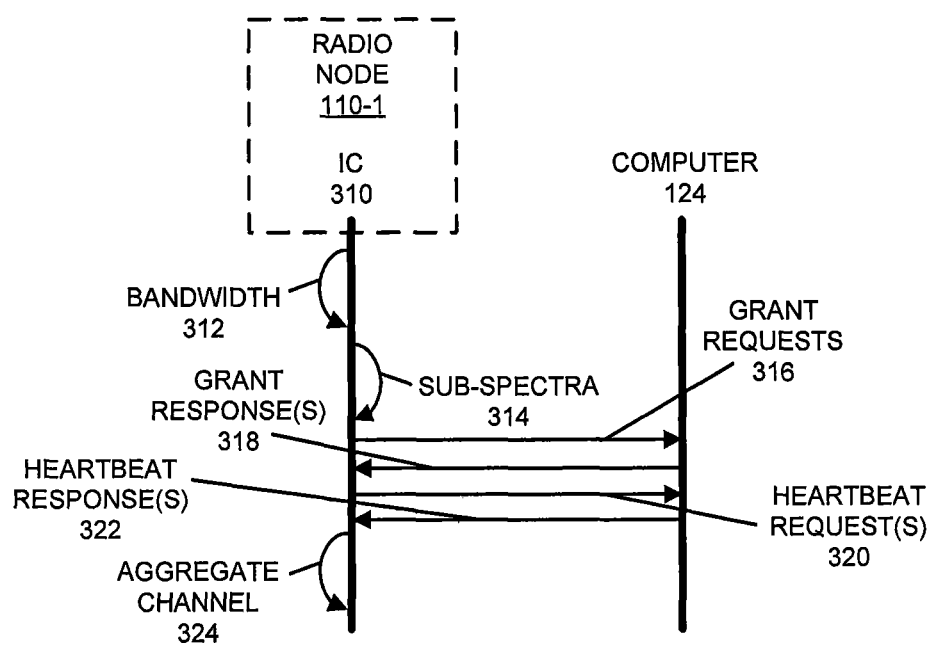
FIG. 3 is a drawing illustrating an example of communication among the electronic devices in FIG. 1 in accordance with an embodiment of the present disclosure.
Figure 4:
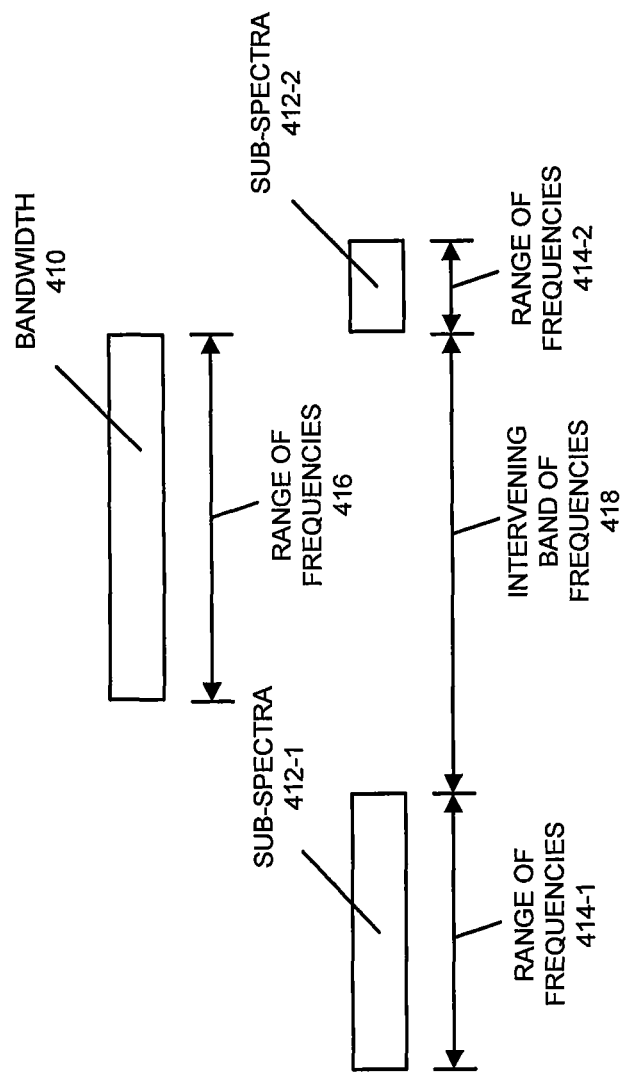
FIG. 4 is a drawing illustrating an example of a technique for providing grant requests to a SAS in accordance with an embodiment of the present disclosure.

Embodiments of the communication technique are further illustrated in FIG. 3, which presents a drawing illustrating an example of communication among radio node 11Q-1 and computer 124. In FIG. 3, an interface circuit (IC) 310 in radio node 110-1 may determine a desired bandwidth 312 in a shared-license-access band of frequencies. Then, interface circuit 310 may identify or select two or more sub-spectra 314 based at least in part on desired bandwidth 312, where a sum of ranges of frequencies in sub-spectra 314 equals desired bandwidth 312, and a given sub-spectra includes a range of frequencies.

Next, interface circuit 310 may provide grant requests 316 for sub-spectra 314 to computer 124, where a given grant request includes a request to reserve a given one of the sub-spectra for use by radio node 110-1. A probability of approval of the given grant request is larger than a probability of a grant request for desired bandwidth 312.

Subsequently, computer 124 may provide one or more grant responses 318 to radio node 110-1, where the one or more grant responses 318 include one or more approvals of grants for one or more of sub-spectra 314. After receiving the one or more grant responses 318, interface circuit 310 may provide one or more heartbeat requests 320 to computer 124 to request authorization to transmit in the one or more granted sub-spectra 314. In response, computer 124 may provide one or more heartbeat responses 322 to radio node 110-1, where the one or more heartbeat responses 322 authorize radio node 110-1 to transmit in the one or more granted sub-spectra 314. When there are two or more granted sub-spectra 314, interface circuit 310 may aggregate sub-spectra 314 into a single aggregate channel 324. While not shown in FIG. 3, if all of sub-spectra 314 are not granted in the grant responses 318, interface circuit 310 may make additional grant requests for other sub-spectra as replacement(s) for the sub-spectra that were not granted.

While FIG. 3 illustrates communication between components using unidirectional or bidirectional communication with lines having single arrows or double arrows, in general the communication in a given operation in this figure may involve unidirectional or bidirectional communication.

In some embodiments of the communication technique, instead of providing a single grant request for a desired bandwidth, a CBSD may provide multiple grant requests for sub-spectra. This is illustrated in FIG. 4, which presents a drawing illustrating an example of a technique for providing grant requests from a CBSD to a SAS. Notably, instead of providing a grant request to the SAS for a desired bandwidth 410, the CBSD may provide two or more grant requests to the SAS for sub-spectra 412. A sum of the ranges of frequencies 414 in sub-spectra 412 may equal a range of frequencies 416 in desired bandwidth 410. Note that at least two of sub-spectra 412 may be separated by an intervening band of frequencies 418 (i.e., at least two of the sub-spectra may non-contiguous). Additionally, at least two of sub-spectra may 412 have different sizes (i.e., range of frequencies 414-1 may not equal range of frequencies 414-2). While only two sub-spectra 412 are shown in FIG. 4, it will be appreciated that three, four, five, six or more sub-spectra 412 may be requested in other embodiments that together encompass a range of frequencies equal to the desired bandwidth 410.

For example, instead of requesting a grant of 40 MHz, the CBSD may provide two grant requests to the SAS for 20 MHz. If at least one of the grant requests is approved by the SAS, then the CBSD will receive a grant for at least 20 MHz, instead of having a grant for 40 MHz denied. In addition, the communication technique allows the 20 MHz bands of frequencies to be widely spaced apart within the CBRS. Note that if both 2Q MHz grant requests are approved by the SAS, the two sub-spectra may be used separately or independently, or may be combined or aggregated into a single logical entity or aggregated channel. Moreover, if one of the grants is later revoked, the CBSD will likely still have one 20 MHz grant, allowing the CBSD to maintain at least some communications despite the revocation of the grant. However, if only a single 40 MHz grant had been requested, revocation of that grant would force the CBSD to cease all communications until such time as a new grant was approved.

We now describe embodiments of an electronic device, which may perform at least some of the operations in the communication technique. FIG. 5 presents a block diagram illustrating an example of an electronic device 500 in accordance with some embodiments, such as one of radio nodes 110, electronic device 112 computer 124. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs or program modules may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that includes one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a pad, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Thus, the communication technique may be implemented at runtime of program module 522. Alternatively or additionally, at least some of the operations in the communication technique may be implemented in a physical layer, such as hardware in interface circuit 518.

While examples of numerical values are provided in the preceding discussion, in other embodiments different numerical values are used. Consequently, the numerical values provided are not intended to be limiting.

While the preceding embodiments illustrated the use of the communication technique with CBRS (e.g., a frequency band near 3.5 GHz), in other embodiments of the communication technique different wireless signals and/or different frequency band(s) may be used. For example, the wireless signals may be communicated in one or more bands of frequencies, including: 900 MHz, 2.4 GHz, 5 GHz, 60 GHz, and/or a band of frequencies used by LTE or another cellular-telephone communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
   a node or connector configured to communicatively couple to a network; and
   an interface circuit, communicatively coupled to the node or connector, configured to communicate with a computer, wherein the interface circuit is configured to:
   determine a desired bandwidth in a shared-license-access band of frequencies, wherein the desired bandwidth is determined based at least in part on: a current capacity demand of the radio node, or an estimated capacity demand of the radio node;
   select two or more sub-spectra based at least in part on the desired bandwidth, wherein a sum of ranges of frequencies in the two or more sub-spectra equals the desired bandwidth, and a given sub-spectra in the two or more sub-spectra comprises a range of frequencies;
   provide, addressed to the computer, grant requests for the two or more sub-spectra, wherein a given grant request in the grant requests comprises a request to reserve a given one of the two or more sub-spectra to be used by the radio node, and a probability of approval of the given grant request is larger than a probability of a second grant request for the desired bandwidth;
   receive grant responses associated with the computer, wherein the grant responses comprise approvals of grants for the two or more sub-spectra;
   provide, addressed to the computer, heartbeat requests to request authorization to transmit in the granted two or more sub-spectra;
   receive heartbeat responses associated with the computer, wherein the heartbeat responses authorize the radio node to transmit in the granted two or more sub-spectra; and
   aggregate the two or more sub-spectra into a single aggregate channel, wherein the aggregation is performed by the radio node without further assistance of another electronic device or another radio node.

2. The radio node of claim 1, wherein the computer comprises a spectrum allocation server (SAS).

3. The radio node of claim 1, wherein the shared-license-access band of frequencies comprises a band of frequencies associated with a Citizens Broadband Radio Service (CBRS).

4. The radio node of claim 1, wherein at least two of the two or more sub-spectra are separated by an intervening band of frequencies.

5. The radio node of claim 1, wherein the communication with the computer comprises wired communication.

6. The radio node of claim 1, wherein at least two of the two or more sub-spectra have different sizes.

7. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

8. The radio node of claim 1, wherein the radio node is configured to maintain at least some communication via remaining authorized and granted two or more sub-spectra when one or more of the remaining authorized and granted two or more sub-spectra is subsequently revoked by the computer.

9. A non-transitory computer-readable storage medium for use in conjunction with a radio node, the computer-readable storage medium storing program instructions that, when executed by the radio node, cause the radio node to perform operations comprising:
   determining a desired bandwidth in a shared-license-access band of frequencies, wherein the desired bandwidth is determined based at least in part on: a current capacity demand of the radio node, or an estimated capacity demand of the radio node;
   selecting two or more sub-spectra based at least in part on the desired bandwidth, wherein a sum of ranges of frequencies in the two or more sub-spectra equals the desired bandwidth, and a given sub-spectra in the two or more sub-spectra comprises a range of frequencies;

providing, addressed to a computer, grant requests for the two or more sub-spectra, wherein a given grant request in the grant requests comprises a request to reserve a given one of the two or more sub-spectra to be used by the radio node, and a probability of approval of the given grant request is larger than a probability of a second grant request for the desired bandwidth;

receiving grant responses associated with the computer, wherein the grant responses comprise approvals of grants for the two or more sub-spectra;

providing, addressed to the computer, heartbeat requests to request authorization to transmit in the granted two or more sub-spectra;

receiving heartbeat responses associated with the computer, wherein the heartbeat responses authorize the radio node to transmit in the granted two or more sub-spectra; and aggregating the two or more sub-spectra into a single aggregate channel, wherein the aggregation is performed by the radio node without further assistance of another electronic device or another radio node.

10. The non-transitory computer-readable storage medium of claim 9, wherein the computer comprises a spectrum allocation server (SAS).

11. The non-transitory computer-readable storage medium of claim 9, wherein the shared-license-access band of frequencies comprises a band of frequencies associated with a Citizens Broadband Radio Service (CBRS).

12. The non-transitory computer-readable storage medium of claim 9, wherein at least two of the two or more sub-spectra are separated by an intervening band of frequencies.

13. The non-transitory computer-readable storage medium of claim 9, wherein the communication with the computer comprises wired communication.

14. The non-transitory computer-readable storage medium of claim 9, wherein at least two of the two or more sub-spectra have different sizes.

15. A method for providing grant requests, comprising: by a radio node:
determining a desired bandwidth in a shared-license-access band of frequencies, wherein the desired bandwidth is determined based at least in part on: a current capacity demand of the radio node, or an estimated capacity demand of the radio node;

selecting two or more sub-spectra based at least in part on the desired bandwidth, wherein a sum of ranges of frequencies in the two or more sub-spectra equals the desired bandwidth, and a given sub-spectra in the two or more sub-spectra comprises a range of frequencies;

providing, addressed to a computer, grant requests for the two or more sub-spectra, wherein a given grant request in the grant requests comprises a request to reserve a given one of the two or more sub-spectra to be used by the radio node, and a probability of approval of the given grant request is larger than a probability of a second grant request for the desired bandwidth;

receiving grant responses associated with the computer, wherein the grant responses comprise approvals of grants for the two or more sub-spectra;

providing, addressed to the computer, heartbeat requests to request authorization to transmit in the granted two or more sub-spectra;

receiving heartbeat responses associated with the computer, wherein the heartbeat responses authorize the radio node to transmit in the granted two or more sub-spectra; and aggregating the two or more sub-spectra into a single aggregate channel, wherein the aggregation is performed by the radio node without further assistance of another electronic device or another radio node.

16. The method of claim 15, at least two of the two or more sub-spectra are separated by an intervening band of frequencies.

17. The method of claim 15, wherein at least two of the two or more sub-spectra have different sizes.

18. The method of claim 15, wherein the computer comprises a spectrum allocation server (SAS).

19. The method of claim 15, wherein the shared-license-access band of frequencies comprises a band of frequencies associated with a Citizens Broadband Radio Service (CBRS).

20. The method of claim 15, wherein the radio node is configured to maintain at least some communication via remaining authorized and granted two or more sub-spectra when one or more of the remaining authorized and granted two or more sub-spectra is subsequently revoked by the computer.

* * * * *